PHASE CODER ALIGNMENT SYSTEM

Filed April 24, 1957

INVENTOR
SOLOMON ZADOFF
BY
[signature]
ATTORNEY

PHASE CODER ALIGNMENT SYSTEM

Filed April 24, 1957 3 Sheets-Sheet 2

A

| | | | | | | | |
|---|---|---|---|---|---|---|---|
| 1 | 2 | 3 | 4 | 5 | 6 | 7 | 0 |
| 2 | 4 | 6 | 0 | 2 | 4 | 6 | 0 |
| 3 | 6 | 1 | 4 | 7 | 2 | 5 | 0 |
| 4 | 0 | 4 | 0 | 4 | 0 | 4 | 0 |
| 5 | 2 | 7 | 4 | 1 | 6 | 3 | 0 |
| 6 | 4 | 2 | 0 | 6 | 4 | 2 | 0 |
| 7 | 6 | 5 | 4 | 3 | 2 | 1 | 0 |
| 0 | 0 | 0 | 0 | 0 | 0 | 0 | 0 |

C

| | | | | | | | |
|---|---|---|---|---|---|---|---|
| 2 | 4 | 6 | 0 | 2 | 4 | 6 | 0 |
| 3 | 6 | 1 | 4 | 7 | 2 | 5 | 0 |
| 4 | 0 | 4 | 0 | 4 | 0 | 4 | 0 |
| 5 | 2 | 7 | 4 | 1 | 6 | 3 | 0 |
| 6 | 4 | 2 | 0 | 6 | 4 | 2 | 0 |
| 7 | 6 | 5 | 4 | 3 | 2 | 1 | 0 |
| 0 | 0 | 0 | 0 | 0 | 0 | 0 | 0 |
| 1 | 2 | 3 | 4 | 5 | 6 | 7 | 0 |

B

| | | | | | | | |
|---|---|---|---|---|---|---|---|
| 1 | 2 | 3 | 4 | 5 | 6 | 7 | 0 |
| 2 | 4 | 6 | 0 | 2 | 4 | 6 | 0 |
| 3 | 6 | 1 | 4 | 7 | 2 | 5 | 0 |
| 4 | 0 | 4 | 0 | 4 | 0 | 4 | 0 |
| 5 | 2 | 7 | 4 | 1 | 6 | 3 | 0 |
| 6 | 4 | 2 | 0 | 6 | 4 | 2 | 0 |
| 7 | 6 | 5 | 4 | 3 | 2 | 1 | 0 |
| 0 | 0 | 0 | 0 | 0 | 0 | 0 | 0 |

D

| | | | | | | | |
|---|---|---|---|---|---|---|---|
| 1 | 2 | 3 | 4 | 5 | 6 | 7 | 0 |
| 2 | 4 | 6 | 0 | 2 | 4 | 6 | 0 |
| 3 | 6 | 1 | 4 | 7 | 2 | 5 | 0 |
| 4 | 0 | 4 | 0 | 4 | 0 | 4 | 0 |
| 5 | 2 | 7 | 4 | 1 | 6 | 3 | 0 |
| 6 | 4 | 2 | 0 | 6 | 4 | 2 | 0 |
| 7 | 6 | 5 | 4 | 3 | 2 | 1 | 0 |
| 0 | 0 | 0 | 0 | 0 | 0 | 0 | 0 |

| UNITS OF PHASE SHIFT | COSINE |
|---|---|
| 1 2 3 4 5 6 7 0 | −0.707 0 +0.707 −1 +0.707 0 −0.707 +1 |
| 1 2 3 4 5 6 7 0 | −0.707 0 +0.707 −1 +0.707 0 −0.707 +1 |
| 1 2 3 4 5 6 7 0 | −0.707 0 +0.707 −1 +0.707 0 −0.707 +1 |
| 1 2 3 4 5 6 7 0 | −0.707 0 +0.707 −1 +0.707 0 −0.707 +1 |
| 1 2 3 4 5 6 7 0 | −0.707 0 +0.707 −1 +0.707 0 −0.707 +1 |
| 1 2 3 4 5 6 7 0 | −0.707 0 +0.707 −1 +0.707 0 −0.707 +1 |
| 1 2 3 4 5 6 7 0 | −0.707 0 +0.707 −1 +0.707 0 −0.707 +1 |
| 1 2 3 4 5 6 7 0 | −0.707 0 +0.707 −1 +0.707 0 −0.707 +1 |

E F

INVENTOR
SOLOMON ZADOFF
BY
[signature]
ATTORNEY

PHASE CODER ALIGNMENT SYSTEM

Filed April 24, 1957 3 Sheets-Sheet 3

INVENTOR
SOLOMON ZADOFF
BY
ATTORNEY

United States Patent Office 3,094,696

Patented June 18, 1963

3,094,696

PHASE CODER ALIGNMENT SYSTEM

Solomon Zadoff, Flushing, N.Y., assignor to Sperry Rand Corporation, a corporation of Delaware Filed Apr. 24, 1957, Ser. No. 654,969
16 Claims. (Cl. 343—103)

This invention relates to communication systems utilizing phase coded pulsed carrier signals and, more particularly, to signal receiving means for use in such systems for aligning locally generated phase coded signals with the transmitted phase coded pulsed carrier signals.

In co-pending patent application Serial No. 588,570, filed on May 31, 1956, in the names of Robert L. Frank and Solomon Zadoff and assigned to the present assignee, there is disclosed a phase coded hyperbolic navigation system utilizing phase coded pulsed carrier transmissions. Phase coding is defined therein as the introduction of discrete amounts of phase shift in the carrier of a pulsed signal, the phase shift being introduced during the time interval between the occurrence of the individual pulses. In co-pending patent application Serial No. 650,534, filed on April 3, 1957, in the name of Robert L. Frank, it is shown that definite systemic advantages accrue if the aforementioned phase shifts follow certain predetermined progressions. For example, by the utilization of particular phase codes providing for such predetermined progressions, the problem of distinguishing between a desired phase coded signal and other signals is simplified to a considerable degree.

Another advantage attributable to the technique of phase coding, which is recognized by the present invention, is that a locally generated phase coded signal may be readily phase synchronized with a transmitted phase coded signal, certain of whose characteristics are known in advance.

It is the general object of the present invention to provide means for synchronizing a locally generated phase coded signal with a received phase coded signal having predetermined phase characteristics.

Another object of the present invention is to cross-correlate a locally generated phase coded signal with a received phase coded signal so as to generate a control signal for use in phase aligning the locally generated phase coded signal with the received phase coded signal.

An additional object is to cross-correlate a locally generated phase coded signal with a received phase coded signal to produce a control signal for modifying the time of occurrence of the locally generated signal for purposes of aligning the locally generated signal with the received signal.

A further object of the present invention is to mix a locally generated phase coded signal with a received phase coded signal so as to produce predetermined beat frequencies the presence of which is indicative of misalignment between the locally generated signal and the received signal.

Yet another object is to compare in phase a locally generated phase coded signal with a received phase coded signal so as to generate an error signal whose frequency is indicative of the rate of change of phase misalignment between the locally generated signal and the received signal.

These and other objects of the present invention, as will appear as the specification proceeds, are accomplished by the provision of phase detection apparatus adapted to receive a phase coded signal and a locally generated phase coded signal, each signal being definable by the same matrix describing the phase progression of the coded signal as measured relative to the phase of an arbitrary continuous wave signal. There is produced at the output of the phase detection apparatus a signal having substantially only a D.C. component in the event that the locally generated signal and the received signal are in phase alignment. On the other hand, there is produced at the output of the phase detection apparatus a signal containing certain predetermined low frequency components in the event of misalignment between the locally generated signal and the received signal.

The matrices defining both the received and the locally generated phase coded signals are comprised of a predetermined number of rows and the same number of columns. The aforementioned output signal from the phase detection apparatus substantially contains only a D.C. component when both the rows and the columns of the respective matrices defining the locally generated signal and the received signal are in alignment. Said output signal contains predictable components whose frequencies are determined by the number of rows of misalignment between the locally generated and received signal matrices in the event that the columns are in alignment.

According to the present invention, a plurality of narrow band pass filters, connected to the output of the phase detection apparatus, are tuned to pass the aforementioned signal components. The individual outputs of the band pass filters are summed together so that a resultant signal is produced whose presence is indicative of the condition of column alignment but row misalignment of the matrices defining the locally generated signal and the received signal. The resultant signal is then applied to the source which produced the locally generated phase coded signal to vary the time of occurrence of the locally generated signal, relative to the time of occurrence of the received signal as long as the aforementioned resultant signal persists. Upon the complete row and column alignment of the matrices defining the received and locally generated phase coded signals, said resultant signal disappears and the time shifting of the locally generated phase coded signal is terminated.

The resultant signal derived from the outputs of the band pass filter appears only in the event of column alignment between the aforementioned matrices. In order to achieve column alignment between the matrix defining the received signal and the matrix defining the locally generated signal in the general case of time misalignment therebetween, means are provided to drift the locally generated matrix of signals relative to the matrix of received signals and to stop said drift as soon as the aforementioned resultant signal appears.

Additionally, means are provided to positively identify the condition wherein the matrices defining the received and locally generated phase coded signals are in both row and column alignment.

For a more complete understanding of the present invention, reference should be had to the following description and to the appended drawings of which:

Figure 1:
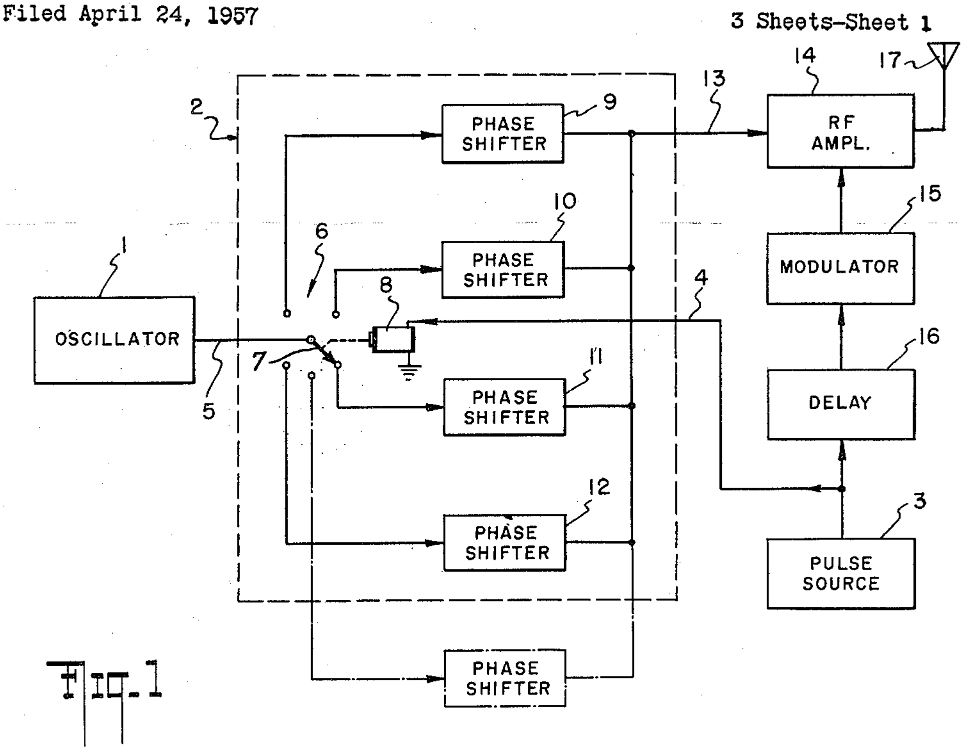
FIG. 1 is a block diagram of a suitable transmitter of phase coded pulsed carrier signals to which the phase coder alignment apparatus of the present invention is responsive.

In FIG. 1, a source of continuous wave carrier signal is generally represented by oscillator 1. The output of oscillator 1 is applied via line 5 to the signal input of phase coder 2, the control input to which is derived from the output of pulse source 3 via line 4. Pulse source 3 represents generally a source of continuous pulses of fixed repetition rate. Phase coder 2 comprises, in the illustrative case of FIG. 1, a mechanical stepping switch 6 whose movable arm 7 advances one contact position in response to individual pulses which are applied via line 4 to stepping relay 8. Phase shifters 9, 10, 11, and 12 each have an input connected to a respective contact of stepping switch 6; the outputs thereof are connected together and are applied via line 13 to the signal input of R-F amplifier 14.

For the sake of simplicity and clarity, stepping switch 6 of phase coder 2 is shown as having but four contact positions. As it will appear more fully in the following, additional contact positions may be required to provide for a greater number of phase shifters depending upon the nature of the phase code employed. In an illustrative case where sixty-four pulses of phase coded signals are produced for one cycle of operation of the phase coder, it will be seen that sixty-four switch contacts and associated phase shifters are required. The extension of phase coder 2 to produce such other phase codes is suggested by the dashed connections.

It will be seen that the signal appearing on line 13 is of the same frequency as the signal input on line 5 but will bear a phase relationship with respect thereto as determined by the particular phase shifter with which movable arm 7 of stepping switch 6 is momentarily in contact. Phase shifters 9, 10, 11, and 12 are adjusted to produce predetermined amounts of phase shift so that the phase of the successive output signals on line 13, as measured relative to the phase of the input signal on line 5, may be represented by a predetermined matrix such as matrix A of FIG. 2.

The individual terms or numerals of matrix A represent the multiplying coefficients of a basic phase angle which may have a value, for example, of 135°. Thus, matrix A is interpreted as having eight rows and eight columns of a total of sixty-four signals, each signal of which has a phase, as measured relative to an arbitrary continuous wave signal, which is equal to the product of 135°, and a respective matrix numeral. For example, the first row of matrix A represents eight successive signals each of whose relative phase is successively 135° (1×135°), 270° (2×135°), 405° (3×135°) . . . and so on.

As more fully disclosed in the aforementioned application Serial No. 650,534, certain systemic advantages accrue when the sequential phase progression of the phase coded signal is adjusted to occur in a predetermined order. An example of such predetermined order is given by matrix A.

Returning to FIG. 1 and as previously mentioned, the phase coded signal output of phase coder 2 is applied via line 13 to the signal input of R-F amplifier 14. R-F amplifier 14 is adapted to pulse modulate the phase coded carrier signals applied thereto in response to modulating pulses as derived from modulator 15. Modulator 15, in turn, is triggered by pulses derived from pulse source 3 via pulse delay device 16. Delay 16 produces a time differential between the operation of phase coder 2 and the operation of R-F amplifier 14 to provide for the diminution of transients, produced by the operation of phase coder 2, before the phase coded pulsed carrier signals are passed by amplifier 14 for radiation by antenna 17.

Figure 3:
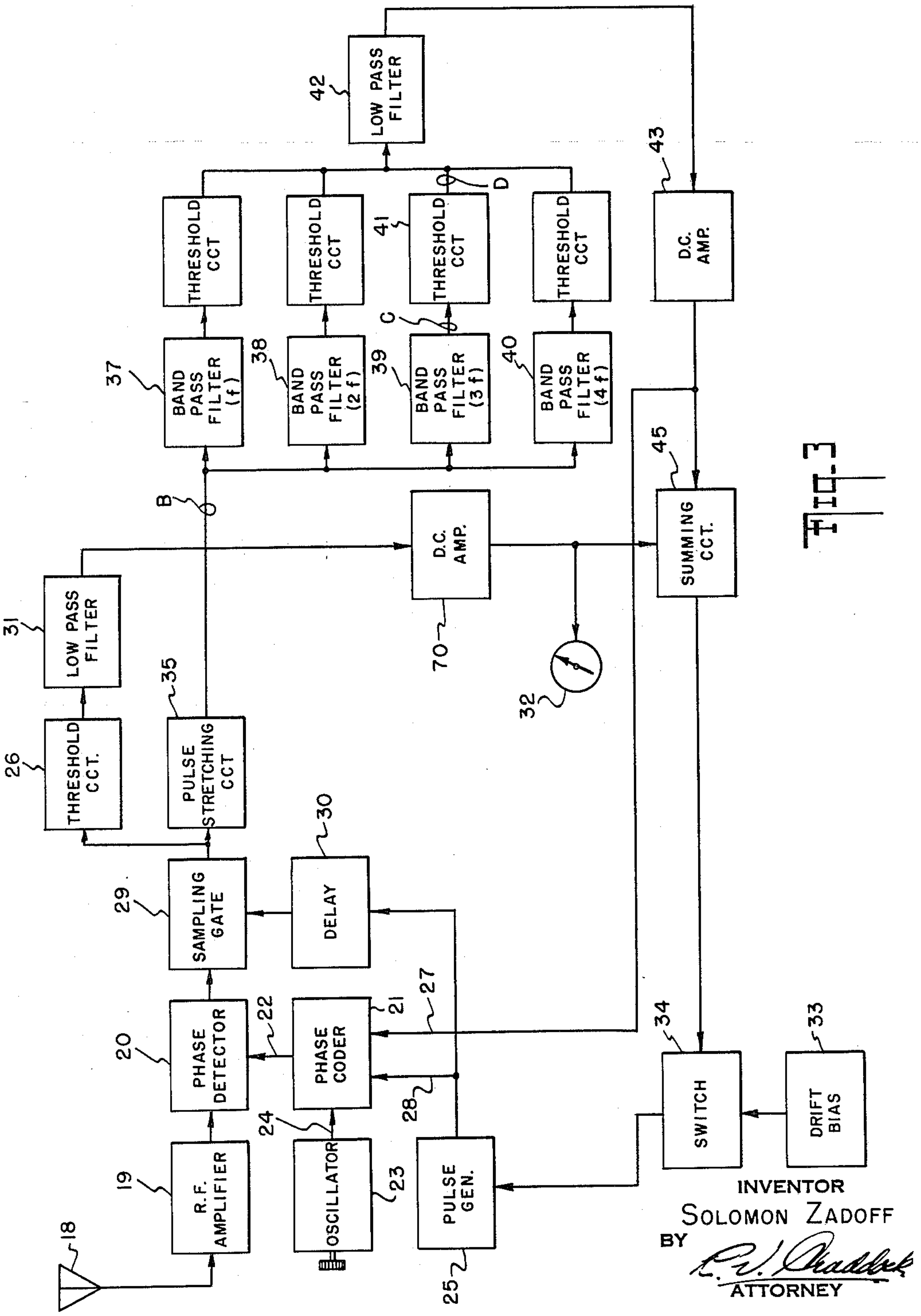
FIG. 3 is a block diagram of a receiver embodying the phase coder alignment apparatus of the present invention which is adapted to receive the signals transmitted by the apparatus of FIG. 1.

The phase coder alignment apparatus of the present invention is embodied in the receiver structure of FIG. 3. In FIG. 3, the phase coded pulsed carrier signals, as may be transmitted by the structure of FIG. 1, are received by antenna 18 and amplified by R-F amplifier 19. The output of amplifier 19 is applied to a first input of phase detector 20, a reference signal input to which is derived from phase coder 21 via line 22. Phase coder 21 may be of a form similar to that of illustrative phase coder 2 of FIG. 1 so as to produce phase coded signals defined by the same matrix as the matrix describing the phase coded signals produced at output line 13 of phase coder 2.

Phase coder 21 structurally differs from phase coder 2 of FIG. 1 only with respect to its actuating mechanism. As previously discussed, movable arm 7 of phase coder 2 advances one contact position in response to individual actuating pulses applied via line 4 to stepping relay 8. For purposes of the present invention, as will more fully be explained hereinafter, the actuating mechanism of phase coder 21 is adapted not only to advance its movable arm one contact position in response to individual applied pulses, but also to abruptly advance the movable arm by a predetermined plurality of contact positions in response to a control signal.

Figure 4:
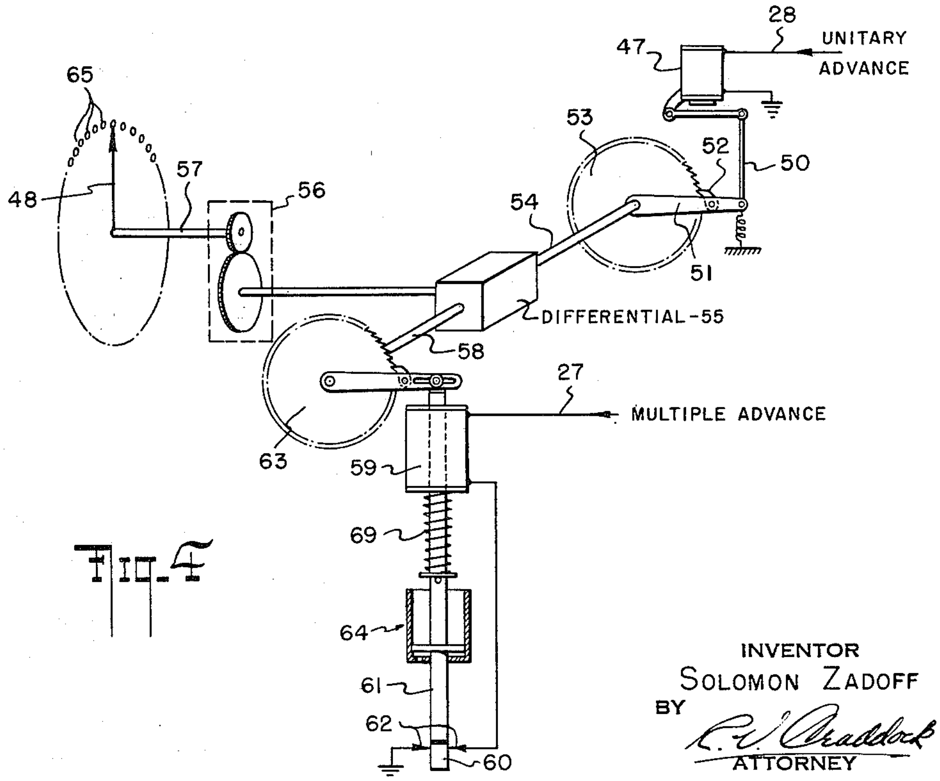
FIG. 4 is a schematic diagram of the actuating mechanism for the phase coder used in FIG. 3.

There is shown in FIG. 4 an illustrative simplified embodiment of the actuating mechanism of phase coder 21. Stepping relay 47 is adapted to receive energizing pulses as applied via line 28 and is operative in response thereto, by means of linkage 50, operating arm 51, and pawl 52 to rotate ratchet 53 through an angle occupied by one peripheral tooth. The angular motion of ratchet 53 is imparted via shaft 54 and differential 55 to gearing 56 which in turn advances movable arm 48 one contact position in response to individual pulses applied via line 28. Gearing 56 is arranged to cause shaft 57 to rotate in equal angular amounts with shaft 54 in the absence of any displacement of shaft 58, which is the second input to mechanical differential 55. Thus, the actuating mechanism so far described will operate in precisely the same fashion (in the absence of displacement of shaft 58) as does stepping switch 6 of FIG. 1.

The additional solenoid and ratchet arrangement of FIG. 4 is adapted to produce an abrupt displacement of movable arm 48 over a predetermined number of contact positions in response to actuation of solenoid 59 by means of an essentially direct control voltage applied via line 27. In response to said direct voltage, solenoid 59 is energized via a continuous conductive path to ground including strip 60, affixed to shaft 61, which conductively connects contacts 62. Upon the energization of solenoid 59, shaft 61 is abruptly displaced, opening contacts 62 and rotating ratchet 63 through an angle occupied by a predetermined plurality of circumferential teeth. Spring 69 returns shaft 61 to its lower or rest position against the resistance of dash pot 64 which introduces a fixed time delay between successive cycles of operation of solenoid 59 in the continued presence of the D.C. control signal.

The rotation of ratchet 63 is imparted via shaft 58, differential 55, gearing 56, and shaft 57 to movable arm 48. Movable arm 48 of FIG. 4 corresponds to movable arm 7 of stepping switch 6 of FIG. 1. Although not shown, it is assumed that each of the contacts 65 are connected to respective phase shift networks as is the case with the contacts of stepping switch 6 of FIG. 1.

The carrier signal input of phase coder 21 of FIG. 3 is obtained from variable frequency oscillator 23 whose frequency is substantially that of oscillator 1 of FIG. 1. The unitary advance input of phase coder 21 is derived from the output of pulse generator 25 which nominally operates at the same repetition rate as that of pulse source 3 of FIG. 1. The output of phase detector 20 is applied to the signal input of sampling gate 29 which is rendered conductive by the pulses produced by generator 25 and applied via pulse delay 30.

As already mentioned, the phase coded signals transmitted by the apparatus of FIG. 1 are in the form of pulses. Assuming that the received signal and the reference inputs to phase detector 20 are in time alignment, the output signal therefrom is also in the form of pulses. The purpose of delay 30 is to activate sampling gate 29 at a time slightly delayed relative to the start of the received pulses so that the pulse envelopes produced at the output of phase detector 20 are sampled by gate 29 during the leading edges thereof. The output of sampling gate 29 is applied by conventional threshold circuit 26, low pass filter 31 and D.C. amplifier 70 to D.C. meter 32.

Figures 2, 5:
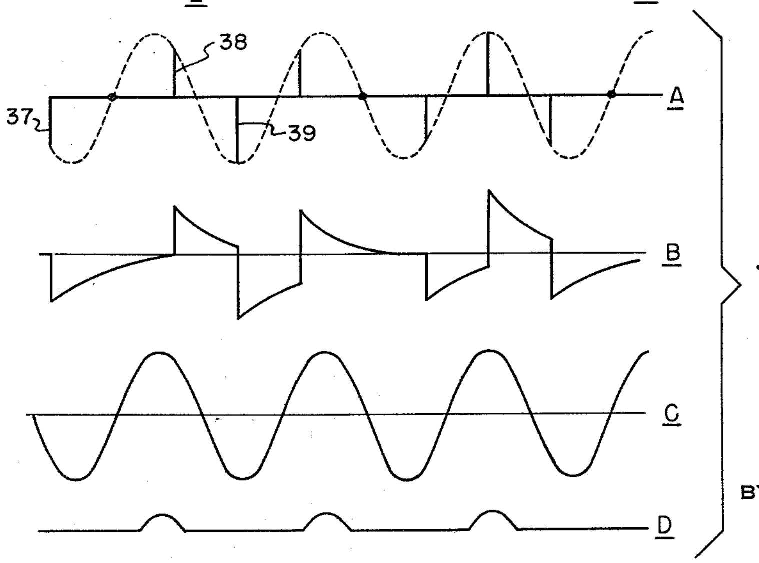
FIG. 2 is a series of matrices and tables useful in explaining the operation of the present invention.
FIG. 5 is a series of waveforms of some of the signals that are produced within the structure of FIG. 3.

It is shown in co-pending application Serial No. 650,-534, that there is produced at the output of phase detector 20 a signal having a D.C. component in the sole event that the matrices defining the received signal and reference signal inputs thereto are in precise row and column alignment. Such a condition of matrix alignment is represented by matrices A and B of FIG. 2. Matrix A, for example, may represent the received signal input to phase detector 20 while matrix B represents the reference signal input thereto as applied via line 22. The relative positions of matrices A and B of FIG. 2 are arranged to indicate that the signals represented by corresponding matrix terms occur at the same time at their respective inputs to phase detector 20.

The utility of the unique D.C. signal component that is produced solely in the event of precise row and column alignment between the matrices defining the phase coded signal inputs to phase detector 20 may be demonstrated as follows. In certain types of communication systems for example, in hyperbolic navigation systems, it is desirable to achieve phase coherence between a remotely situated secondary timing standard and a highly precise locally situated primary standard. The primary and secondary timing standards may be respectively, a transmitter carrier oscillator and a receiver local oscillator. In such a case, coherence is achieved by communicating carrier oscillator phase information to the receiver local oscillator.

The phase coding of the signals contemplated by the present invention may be considered to be a medium for the discriminatory reception by the receiver of FIG. 3 of information representing the phase of the carrier signal generated by oscillator 1 of FIG. 1. The received carrier phase information is employed in achieving phase coherence between oscillator 23 of FIG. 3 and oscillator 1 of FIG. 1. The presence of a D.C. signal component at the output of detector 20 of FIG. 3 unambiguously signifies the attainment of coherence between the received phase coded signal and the reference phase coded signal applied thereto. This, in turn, indicates that phase coherence has been established between oscillator 23 of FIG. 3 and oscillator 1 of FIG. 1.

A primary objective of the present invention is to rapidly accomplish phase coherence between the phase coded signals applied to detector 20 of FIG. 3.

It will be recognized that in the geenral case the signals produced at the output of phase coder 21 will not be initially in alignment with the received phase coded signals at the input of phase detector 20. Means are therefore provided for varying the time of occurrence of the output signals of phase coder 21 to search for the received signals. The aforementioned means include a source of drift bias 33 which is applied via conducting switch 34 to pulse generator 25 to vary the frequency at which it is operating in a conventional manner. As the signal output of phase coder 21 is drifted in time relative to the occurrence of the received phase coded signals, the columns of the reference matrix, representing the drifting signals, will ultimately occur at the same time as the columns of the matrix describing the received signals. Upon the event of such column alignment, the rows of the matrix will generally be misaligned.

The present invention recognizes that in such a case of matrix column alignment but row misalignment, one of a discrete number of low frequency signal components will be produced at the output of phase detector 20.

Matrices C and D of FIG. 2 represent the aforementioned condition wherein there is column alignment but row misalignment between the received and locally generated signal matrices. Inasmuch as the basic phase angle, of which the terms shown in the matrices are coefficients, is the same for both matrices, the relative phase between the signals represented by corresponding matrix terms may be ascertained by merely subtracting corresponding terms. Assuming, for example, that matrix C represents the received signal at the input of phase detector 20 while matrix D represents the locally generated signals at the reference input thereto, Table "E" lists the individual phase differences between corresponding signals.

It was previously stated for illustrative purposes that the basic phase angle, common to the received and locally generated phase coding matrices, may be 135°. Referring to Table "E," each numeral thereof must be multiplied by such basic phase angle, namely, 135°. Table "F" lists the value of the cosine of the angle resulting from the multiplication of the individual terms of Table "E" with 135°.

The significance of the cosine function is that phase detector 20 produces an output signal whose amplitude is proportional to the cosine of the phase angle between the two input signals applied thereto as is well known in the art. A pictorial representation of Table "F" is shown in waveform A of FIG. 5. The vertical solid line portions of waveform A represent a plot of any one row of Table "F," i.e., portion 37 has an amplitude of −0.707, portion 38 has an amplitude of +0.707, vertical portion 39 has an amplitude of −1, and so on. The zero values of Table "F" are shown as dots in waveform A. The time interval between the successively plotted values of Table "F" in waveform A is made equal to represent the equal time separation between the pulses at the sampled output of phase detector 20, which samples occur at equal time intervals. The dotted line of waveform A is superimposed on the vertical solid lines to denote the presence of a fundamental frequency, three cycles of which are produced each time a row of signal matrix C and a row of reference matrix D are simultaneously applied to their respective inputs of phase detector 20.

The pulsed signals appearing at the output of sampling gate 29 of FIG. 3 thus contain the aforementioned low frequency component, which low frequency component is enhanced by pulse stretching filter 35. In other words, pulse stretching filter 35 operates on the solid line waveform A to produce waveform B. Pulse stretching filter 35 may be of a form of a low pass filter to accomplish such result. The output of pulse stretching filter 35 is simultaneously applied to respective inputs of band pass filters 37, 38, 39, and 40, each of which filters is tuned to a different harmonic of the basic low frequency signal which may appear at the output of pulse stretching filter 35.

In the case represented by matrices C and D of FIG. 2, wherein the applied and reference signal matrices are aligned in column but misaligned by one row, the third harmonic of the aforementioned low frequency signal is present at the output of pulse stretching filter 35. Band pass filter 39 is adapted to pass substantially only such frequency to conventional threshold circuit 41, similar to threshold circuit 26. Circuits 26 and 41 each may be, for example, a back-biased diode adapted to pass the signal output of filter 39 when it exceeds a predetermined amplitude.

Waveform C of FIG. 5 shows the signal present at the output of filter 39 in the assumed case while waveform D is the signal derived therefrom and passed by threshold circuit 41. The D.C. component of waveform D is passed by low pass filter 42 and applied to D.C. amplifier 43. The output of amplifier 43 is connected to the multiple advance control input of phase coder 21 via line 27. Said output is also connected to a first input of summing circuit 45, a second input to which is derived from the output of D.C. amplifier 70.

Switch 34 is normally closed thereby applying drift bias 33 to generator 25. Upon the occurrence of an output signal from summing circuit 45, switch 34 is rendered nonconductive and the drifting of generator 25 ceases so as to restore the repetition rate of its pulses to the repetition rate of the received pulses of the phase coded signal. The presence of an output signal from either of the low pass filters 31 and 42 is indicative of column alignment between the matrices defining the received signal and reference signal inputs to phase detector 20. It should be noted that an output signal from filter 31 signifies not only column alignment but row alignment as well.

In operation, assuming that the received signal and reference inputs of phase detector 20 are as represented by matrices C and D of FIG. 2, the low frequency signal represented by waveform C of FIG. 5 will appear at the output of filter 39. The D.C. component of waveform C, when exceeding a predetermined amplitude as fixed by the threshold circuit 41, causes the abrupt advance of movable arm 48 of phase coder 21 by a predetermined number (N) of contact positions. In terms of matrix D of FIG. 2, the abrupt advance of movable arm 48 by N contact positions will produce a corresponding abrupt shift in matrix D, relative to matrix C, by one row, thereby aligning the matrices, inasmuch as there are N contact positions 65 of phase coder 21 for each row.

It has been ascertained that when the matrix defining the locally generated signal is in column alignment with the matrix defining the received signal but is misaligned therewith by other than one row, different harmonics of a low frequency $f$ are present at the output of phase detector 20, whose frequencies are related to the number of rows of misalignment. More particularly, it has been observed that where matrices such as C and D of FIG. 2 are misaligned by one row, the harmonic frequency of $3f$ is produced; when misaligned by two rows, the harmonic frequency of $2f$ is produced; when misaligned by three rows, the base frequency of $f$ is produced; and when misaligned by four rows, the harmonic frequency of $4f$ is produced. Additionally, it has been discovered that for seven rows of misalignment the same frequency is produced as results from one row of misalignment; six rows of misalignment produce the same frequency as two rows of misalignment and five rows of misalignment produce the same frequency as three rows of misalignment. Thus, depending on the number of rows of misalignment between the received and locally generated signal matrices, a frequency $f$ or discrete harmonics thereof will be produced.

Band pass filter 37 is tuned to pass the base frequency $f$; band pass filter 38 passes the harmonic frequency $2f$; band pass filter 39 passes the harmonic frequency $3f$; and band pass filter 40 passes the harmonic frequency $4f$. It should be observed that in the event that phase coded signals represented by extended matrices are utilized, i.e., matrices including more than sixty-four phase coded signals, additional harmonics of $f$ will be produced.

As already discussed, frequency $f$ and harmonics thereof are produced in the event that the received and locally generated signal matrices are in column alignment but row misalignment. It readily will be appreciated that during the initial process of achieving that degree of matrix alignment, said matrices will in general be misaligned both in column and in row. In the case of column misalignment of the matrices, there are produced frequency components other than $f$ and its harmonics. Such other frequencies are intermediate $f$ and its harmonics and for that reason the illustrative embodiment of FIG. 3 utilizes band pass filters to select only the proper predetermined frequency components.

The precise frequencies to which band pass filters 37, 38, 39, and 40 are tuned may be determined in the following manner. By definition, the aforementioned basic phase angle of which the terms of the matrices are coefficients is $$\phi=\frac{2\pi p}{N}$$

where $p$ and N are integers greater than zero, and $p$ is relatively prime to N. That is, there are no integers $a$ and $b$ both of which are less than N such that $ap=bN$. As an example, if N equals 8, then $$\frac{b}{a}=\frac{p}{8}$$

Accordingly, $p$ may have the values of 1 or 3 or 5, etc., any one of which values will satisfy the requirement that $p$ be relatively prime to N.

Thus, the phase angle of the general term of the reference signal matrix, as applied via line 22 to phase detector 20, may be represented by $$\theta_{x,y}=\frac{2\pi pxy}{N} \qquad (1)$$

where $x$ and $y$ respectively represent the row and column number of the general term. The basic phase angle of the matrix defining the received signal input to phase detector 20 may be represented by $$\phi_{(x+Q),y}=\frac{2\pi p(x+Q)y}{N} \qquad (2)$$

where Q represents the number of rows of misalignment between the signal and reference matrices. The phase difference between the individual terms of the signal and reference matrices may be ascertained by subtracting (1) from (2) to yield $$\delta=\frac{2\pi pQy}{N} \qquad (3)$$

Now, let T equal the time interval between the successive pulses comprising the rows of the matrices. The frequency of the difference angle, i.e., $\Delta\delta/T$, can be shown to be equal to the function $2\pi pQ/NT$. Accordingly, band pass filter 37 is tuned to pass the frequency of $2\pi p/NT$; band pass filter 38 is tuned to pass the harmonic frequency of $4\pi p/NT$; band pass filter 39 is tuned to pass the harmonic frequency of $6\pi p/NT$; and band pass filter 40 is tuned to pass the harmonic frequency of $8\pi p/NT$.

It can be seen from the preceding description that the objects of the present invention have been achieved by the provision of phase coder alignment apparatus adapted to receive a phase coded pulsed carrier signal and to cross-correlate (as by means of a phase detector) said received signal with a locally generated phase coded signal. The invention utilizes the unique properties of phase coded signals, when used in a cross-correlating detection process, whereby discrete low frequency signal components are produced in the event that there is column alignment between the reference and received signal matrices, but row misalignment. The presence of such low frequency signals is detected and a control signal is produced therefrom for abruptly adjusting the phase coder for the locally generated signal so as to quickly shift the locally generated phase coded signal matrix relative to that of the received signal to produce phase alignment between the local signal and the received signal matrices. The invention further provides for positive identification of the condition of phase alignment between the aforementioned matrices. There is also provided means for drifting the locally generated matrix relative to the received signal matrix until column alignment is produced whereupon the drifting is terminated and the alignment process, per se, is begun.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In combination, signal detector means having two inputs and an output and adapted to receive at one of said inputs pulsed phase coded carrier signals defined by a predetermined matrix of N rows and N columns, a local source for producing phase coded reference signals defined by said matrix, said local source including means for drifting said matrix of reference signals in time relative to said matrix of carrier signals, means responsive to first and second control signals for deactivating said means for drifting, and means for abruptly shifting said matrix of reference signals in time relative to said matrix of carrier signals in increments of matrix rows in response to said second control signal, the output of said local source being connected to the other of said detector inputs, said detector being operative to cross-correlate said carrier and reference signals so as to produce at said output a signal related to the relative phase therebetween, means for sampling the output signal of said detector in response to applied triggers, said local source including a source of said triggers, means adapted to receive the output signal of said sampling means for producing said first control signal related to the D.C. component thereof, and means adapted to receive said output signal of said sampling means for sensing the presence of harmonically related frequency components thereof and for producing said second control signal in response thereto, means for applying said first and second control signals to said means for deactivating said means for drifting, and means for applying said second control signal to said means for abruptly shifting.

2. Apparatus as defined in claim 1 wherein said signal detector means comprises a phase detector.

3. Apparatus as defined in claim 1 wherein said means for producing said first control signal comprises a low pass filter.

4. Apparatus as in claim 1 wherein said means for sensing comprises a plurality of band pass filters each tuned to a different harmonic of a predetermined frequency, the input terminals of said filters being connected to the output of said sampling means and the output terminals thereof being connected together.

5. Apparatus as defined in claim 4 wherein said predetermined frequency is defined as being equal to $2\pi p/NT$ where T represents the time interval between the successive pulses of said pulsed phase coded carrier signal, and where $p$ and N are integers greater than zero, $p$ being relatively prime to N.

6. In combination, signal detector means having two inputs and an output and adapted to receive at one of said inputs phase coded carrier signals defined by a predetermined matrix of N rows and N columns, a local source for producing phase coded reference signals defined by said matrix, said local source including means for drifting said martix of reference signals in time relative to said matrix of carrier signals, means responsive to the sum of first and second control signals for deactivating said means for drifting, and means for abruptly shifting said matrix of reference signals in time relative to said matrix of carrier signals in increments of matrix rows in response to said second control signal, the output of said local source being connected to the other of said detector inputs, said detector being operative to cross-correlate said carrier and reference signals so as to produce at said output a signal related to the relative phase therebetween, means adapted to receive the output signal of said detector means for producing said first control signal related to the D.C. component thereof, means adapted to receive said output signal of said detector means for sensing the presence of harmonically related frequency components thereof and for producing said second control signal in response thereto, means for summing said first and second control signals and for applying the sum thereof to said means for deactivating said means for drifting, and means for applying said second control signal to said means for abruptly shifting.

7. In combination, signal detector means having two inputs and an output and adapted to receive at one of said inputs pulsed phase coded carrier signals defined by a predetermined matrix of N rows and N columns, a local source for producing phase coded reference signals defined by said matrix, said local source including means for abruptly shifting said matrix of reference signals in time relative to said matrix of carrier signals in increments of matrix rows in response to a control signal, the output of said local source being connected to the other of said detector inputs, said detector being operative to cross-correlate said carrier and reference signals so as to produce at said output a signal related to he relative phase therebetween, means for sampling the output signal of said detector in response to applied triggers, said local source including a source of said triggers, means adapted to receive said output signal of said sampling means for sensing the presence of harmonically related frequency components thereof and for producing said control signal in response thereto, and means for applying said control signal to said means for abruptly shifting.

8. Apparatus as defined in claim 7 wherein said signal detector means comprises a phase detector.

9. Apparatus as defined in claim 7 wherein said means for sensing comprises a plurality of band pass filters each tuned to a different harmonic of a predetermined frequency, the input terminals of said filters being connected to the output of said sampling means and the output terminals thereof being connected together.

10. Apparatus as defined in claim 9 wherein said predetermined frequency is defined as being equal to $2\pi p/NT$ where T represents the time interval between the successive pulses of said pulsed phase coded carrier signal, and where $p$ and N are integers greater than zero, $p$ being relatively prime to N.

11. In combination, signal detector means having two inputs and an output and adapted to receive at one of said inputs phase coded carrier signals defined by a predetermined matrix of N rows and N columns, a local source for producing phase coded reference signals defined by said matrix, said local source including means for abruptly shifting said matrix of reference signals in time relative to said matrix of carrier signals in increments of matrix rows in response to a control signal, the output of said local source being connected to the other of said detector inputs, said detector being operative to cross-correlate said carrier and reference signals so as to produce at said output a signal related to the relative phase therebetween, means adapted to receive said output signal of said detector means for sensing the presence of harmonically related frequency components thereof and for producing said control signal in response thereto, and means for applying said control signal to said means for abruptly shifting.

12. In combination, signal detector means having two inputs and an output and adapted to receive at one of said inputs pulsed phase coded carrier signals defined by a predetermined matrix of N rows and N columns, a local source for producing phase coded reference signals defined by said matrix, said local source including means for drifting said matrix of reference signals in time relative to said matrix of carrier signals, means responsive to first and second control signals for deactivating said means for drifting, and means for abruptly shifting said matrix of reference signals in time relative to said matrix of carrier signals in increments of matrix rows in response to said second control signal, the output of said local source being connected to the other of said detector inputs, said detector being operative to cross-correlate said carrier and reference signals so as to produce at said output a signal related to the relative phase therebetween, means for sampling the output signal of said detector in response to applied triggers, said local source including a source of said triggers, means adapted to receive the output signal of said sampling means for producing said first control signal related to the D.C. component thereof, and means adapted to receive said output signal of said sampling means for sensing the presence of at least one component thereof having a frequency of $2\pi pQ/NT$ and for producing said second control signal in response thereto, where Q represents the number of rows of misalignment between the matrices defining said carrier and reference signals, where T represents the time interval between successive pulses of said pulsed phase coded carrier signal, and where $p$ and N are integers greater than zero, $p$ being relatively prime to N, means for applying said first and second control signals to said means for deactivating said means for drifting, and means for applying said second control signal to said means for abruptly shifting.

13. In combination, signal detector means having two inputs and an output and adapted to receive at one of said inputs phase coded carrier signals defined by a predetermined matrix of N rows and N columns, a local source for producing phase coded reference signals defined by said matrix, said local source including means for drifting said matrix of reference signals in time relative to said matrix of carrier signals, means responsive to the sum of first and second control signals for deactivating said means for drifting, and means for abruptly shifting said matrix of reference signals in time relative to said matrix of carrier signals in increments of matrix rows in response to said second control signal, the output of said local source being connected to the other of said detector inputs, said detector being operative to cross-correlate said carrier and reference signals so as to produce at said output a signal related to the relative phase therebetween, means adapted to receive the output signal of said detector means for producing said first control signal related to the D.C. component thereof, means adapted to receive said output signal of said detector means for sensing the presence of at least one component thereof having a frequency of $2\pi pQ/NT$ and for producing said second control signal in response thereto, where Q represents the number of rows of misalignment between the matrices defining said carrier and reference signals, where T represents the time interval between successive pulses of said pulsed phase coded carrier signal, and where $p$ and N are integers greater than zero, $p$ being relatively prime to N, means for summing said first and second control signals and for applying the sum thereof to said means for deactivating said means for drifting, and means for applying said second control signal to said means for abruptly shifting.

14. In combination, signal detector means having two inputs and an output and adapted to receive at one of said inputs pulsed phase coded carrier signals defined by a predetermined matrix of N rows and N columns, a local source for producing phase coded reference signals defined by said matrix, said local source including means for abruptly shifting said matrix of reference signals in time relative to said matrix of carrier signals in increments of matrix rows in response to a control signal, the output of said local source being connected to the other of said detector inputs, said detector being operative to cross-correlate said carrier and reference signals so as to produce at said output a signal related to the relative phase therebetween, means for sampling the output signal of said detector in response to applied triggers, said local source including a source of said triggers, means adapted to receive said output signal of said sampling means for sensing the presence of at least one component thereof having a frequency of $2\pi pQ/NT$ where Q represents the number of rows of misalignment between the matrices defining said carrier and reference signals, where T represents the time interval between successive pulses of said pulsed phase coded carrier signals, and where $p$ and N are integers greater than zero, $p$ being relatively prime to N, and means for applying said control signal to said means for abruptly shifting.

15. In combination, signal detecting means having two inputs and an output and adapted to receive at one of said inputs phase coded carrier signals defined by a predetermined matrix of N rows and N columns, a local source for producing phase coded reference signals defined by said matrix, said local source including controllable means for abruptly shifting said matrix of reference signals in time relative to said matrix of carrier signals in increments of matrix rows, the output of said local source being connected to the other of said detector inputs, said detector being operative to cross-correlate said carrier and reference signals so as to produce at said output a signal related to the relative phase therebetween, and means adapted to receive said output signal of said detector means for sensing the presence of harmonically related frequency components thereof.

16. In combination, signal detecting means having two inputs and an output and adapted to receive at one of said inputs phase coded carrier signals defined by a predetermined matrix of N rows and N columns, a local source for producing phase coded reference signals defined by said matrix, said local source including controllable means for abruptly shifting said matrix of reference signals in time relative to said matrix of carrier signals in increments of matrix rows, the output of said local source being connected to the other of said detector inputs, said detector being operative to cross-correlate said carrier and reference signals so as to produce at said output a signal related to the relative phase therebetween, and means adapted to receive said output signal of said detector means for sensing at least one component thereof having a frequency of $2\pi pQ/NT$ where Q represents the number of rows of misalignment between the matrices defining said carrier and reference signals, where T represents the time interval between successive pulses of said pulsed phase coded carrier signals, and where $p$ and N are integers greater than zero, $p$ being relatively prime to N.

References Cited in the file of this patent

UNITED STATES PATENTS

| | | |
|---|---|---|
| 2,526,425 | Schulthers | Oct. 17, 1950 |
| 2,601,392 | Hammond | June 24, 1952 |